United States Patent [19]

Decker et al.

[11] 4,176,202

[45] Nov. 27, 1979

[54] VEGETABLE PROTEIN INGREDIENT FOR KAMABOKO PRODUCTS

[75] Inventors: Carl D. Decker, St. Louis, Mo.; S. Kent Holt, Tokyo, Japan

[73] Assignee: Ralston Purina Company, St. Louis, Mo.

[21] Appl. No.: 948,596

[22] Filed: Oct. 4, 1978

Related U.S. Application Data

[63] Continuation of Ser. No. 826,510, Aug. 22, 1977, abandoned.

[51] Int. Cl.$^2$ ............................................. A23L 1/325
[52] U.S. Cl. .................................... 426/574; 426/643; 426/656
[58] Field of Search ............... 426/574, 601, 602, 603, 426/643, 656, 802

[56] References Cited

U.S. PATENT DOCUMENTS

| 3,663,234 | 5/1972 | Ichihata | 426/643 X |
| 3,814,823 | 6/1974 | Yang et al. | 426/656 X |
| 3,885,052 | 5/1975 | Starr | 426/656 X |
| 3,891,776 | 6/1975 | Carpenter et al. | 426/574 X |
| 3,900,576 | 8/1975 | Schulz | 426/643 X |

OTHER PUBLICATIONS

Yasumatsu, K. et al., "Utilization of Soybean Products in Fish Paste Products," Agr. Bio. Chem., vol. 36, 1972, pp. 737-744.
Saio, K. et al., "Food Uses of Soybean 7s and 11s Proteins", Jour. of Food Science, vol. 38, 1973, pp. 1139-1144.

Primary Examiner—Robert A. Yoncoskie
Attorney, Agent, or Firm—Virgil B. Hill

[57] ABSTRACT

A vegetable protein composition which is suitable as a replacement for fresh or frozen fish in Kamaboko products is disclosed. The composition comprises a mixture of a vegetable protein isolate and a fat emulsion containing fat at a level exceeding about 20% by weight. The composition does not detract from the color, texture, and flavor of Kamaboko products when used as a replacement for fish.

13 Claims, No Drawings

VEGETABLE PROTEIN INGREDIENT FOR KAMABOKO PRODUCTS

This is a continuation application of U.S. Ser. No. 826,510 filed Aug. 22, 1977, now abandoned.

BACKGROUND OF THE INVENTION

This invention relates to gelled fish products commonly referred to as "Kamaboko" type products, and to a vegetable protein composition which is an acceptable ingredient for gelled fish products.

"Kamaboko" is an immensely popular food in the Japanese diet and generally companies an elastic, gelled, heat-pastuerized fish product. "Kamaboko" is made by separation of fish muscle, which is washed to remove blood, pigments and fat. The washed fish flesh is minced or reduced to a pulp and ground with other ingredients such as starch, sugar, egg white, salt and flavorings such as "mirin" and various flesh extracts. The resulting fish paste is then formed into the desired shape and cooked. There are three main types of "Kamaboko" products including Kamaboko, Chikuwa, and Agekama, each having its own shape and a specific manner of cooking associated with each type of product. For example, steaming is the cooking method of choice for most types of Kamaboko, whereas, broiling is used mainly for Chikuwa, and deep fat frying is used for Agekama.

The distinctive eating characteristic of "Kamaboko type" products is its elastic quality, called "ashi" in Japanese. This refers to the primary feature of this product wherein if it is subjected to pressure, it becomes indented, but can recover readily to its original shape after pressure removal. The elastic quality of "ashi" of Kamaboko depends on the species of fish used, freshness of the ingredients, as well as the processing techniques employed. Another limiting factor for Kamaboko quality besides texture is color, since a very white color is considered to be essential for a quality product. In spite of the critical importance of texture as a measure of Kamaboko quality, color is equally as critical since this is due primarily to the types of fish flesh employed and their relative whiteness. Unfortunately, many of the types of fish which are considered to be the most desirable from a textural as well as a color standpoint are very much in demand and, therefore, will be in increasingly short supply. This has necessitated the investigation of a variety of ingredients which can be employed as a total or partial replacement for the fish flesh employed in Kamaboko products. For example, U.S. Pat. Nos. 3,955,011 and 3,959,517 describe the production of a fish meat powder for making Kamaboko type products with a gel strength comparable to that of Kamaboko made from fresh fish meat.

Yasumetsu et al in *Agr. Biol. Chem.* 36, p. 737-744 (1972) has evaluated various types of soybean products in fish paste products. Among the types of soybean products evaluated are soy protein isolates, products which are well known in the vegetable protein processing industry. These products generally have a protein content of 90% or greater and are highly functional in the formation of gelled food products. They, therefore, are ideal candidates as a complete or partial replacement of fresh fish flesh in Kamaboko. Unfortunately, as described by the above authors, the use generally of soy protein isolates has not been successful since they detracted somewhat from the texture and overall quality of the Kamaboko products. The most serious defect encountered, however, with the use of soy protein isolates was the inferior color of Kamaboko products containing soy protein isolates. Kamaboko products containing soy protein isolates generally had a darker color and, therefore, represented a serious departure from color standards considered as a minimum for this type of product. Therefore, in spite of the consideration given to these materials as an ingredient for Kamaboko products they have generally been considered unsuitable as an ingredient, and modification of a vegetable protein isolate to permit use in a Kamaboko type product would represent a significant breakthrough.

It is an object of the present invention to produce a vegetable protein composition which is suitable as an ingredient in Kamaboko products.

It is also an object of the present invention to produce a vegetable protein composition which does not impart an undesirable color to Kamaboko products when used as partial replacement for fresh fish flesh.

It is a further object to produce Kamaboko products containing a vegetable protein isolates as a partial replacement for fresh fish wherein acceptable color and texture of the product is maintained.

SUMMARY OF THE PRESENT INVENTION

The present invention comprises a vegetable protein composition which can be employed at least as a partial replacement for fresh or frozen fish flesh in Kamaboko products. This composition comprises a mixture of a vegetable protein powder such as a vegetable protein isolate and a fat emulsion having a fat content exceeding about 20% by weight. The dried composition can be used as a partial replacement for fresh fish in "Kamaboko Type" products at a level up to about 90% by weight of the fish flesh without adversely affecting the color or texture of the product. It is, of course, essential to produce a product which is essentially white in appearance with a good elastic, gelled texture. Both of these are primary factors, other than flavor for the sensory evaluation of gelled fish products such as Kamaboko.

The dried vegetable protein composition of the present invention specifically comprises about 60-90% by weight of a vegetable protein isolate and about 10-40% by weight of a fat emulsion having a fat content exceeding 20% by weight. This composition when used in Kamaboko products at typical levels up to 90% by weight of the fish flesh show acceptable whiteness and texture thereby obviating the difficulties previously encountered in attempting to use vegetable protein isolates as ingredients for gelled fish products.

DESCRIPTION OF THE PREFERRED EMBODIMENTS

For purposes of a better understanding of the general type of gelled fish products to which the present invention relates Kamaboko type products are typically produced pursuant to the following procedure, although actual formulas and techniques will vary, depending on local tastes and customs in Japan.

Fish used as the starting material for Kamaboko are beheaded and eviscerated followed by mechanical separation of the flesh from the skin and bones. This is usually accomplished by pressing the fish through a perforated drum or plate to separate the flesh from the skin and bones. This separated flesh is minced as a result of the above procedure and this material is washed with chilled water to remove residual blood, pigments, mucus, and fat. Any one of these materials would, of course, detract from either the color or texture of the Kamaboko product. One part by weight of fish flesh is stirred with five to seven parts of chilled water and the entire operation is repeated a number of times. The washed fish flesh is then dewatered by pressing or centrifugation.

The dewatered minced flesh is reduced to a pulp and ground with salt and other ingredients for 30–50 minutes. Grinding is carried out by a combination of kneading and crushing of the fish muscle to produce a sticky paste. The ingredients used in Kamaboko vary widely dependent on the type of product, cost, or locale of production, therefore, a listing of specific materials used in Kamaboko products would be difficult. The most common indredients include salt, usually 2.5–4%, flavoring or seasoning ingredients such as sugar, monosodium glutamate and inosinate, flesh extractives, and "mirin". Egg white is added to improve glossiness of the product and starch is added when necessary to improve elasticity of the product.

The ground fish paste is then shaped into the desired form and cooked depending on the specific type of Kamaboko product desired. For example, steaming is used for most types of Kamaboko products, whereas broiling and deep fat frying are also used.

The vegetable protein composition of the present invention, can be employed in any general type of process for the production of "Kamaboko Type Products", at least as a partial replacement for fish flesh and the specific point in the process at which it is included is not critical. For example, the vegetable protein composition of the present invention can be dry blended with the fish flesh and water either prior to or subsequent to grinding of the product. It is, however, preferred for ease and convenience that the vegetable protein composition of the present invention be hydrated in a typical but non-limiting ratio of 1 part vegetable protein material to 4 parts water, followed by addition to the fish flesh before grinding. In this manner, the best distribution of the vegetable protein material is obtained commensurate with the desired improvement in texture and color.

The level at which the vegetable protein composition of the present invention may be employed in Kamaboko type products will again vary widely depending on color, texture, and flavor of the product. At the very least, it is considered preferable in order to retain the desired flavor in the Kamaboko product to provide a sufficient level of fresh fish in order to maintain the desired taste and flavor. Therefore, even though higher levels of the vegetable protein composition will still produce acceptable products from a color or textural standpoint, the product may not be recognized exactly as Kamaboko per se because of the low levels of fish. Therefore, for purposes of the present invention, the vegetable protein composition developed herein may be used as a functional replacement for fish flesh in "Kamaboko Type" products at levels of up to about 90% by weight of the fish flesh although, if one is attempting to retain a recognized standard of identity for Kamaboko, a preferred compromise insofar as texture, color, and flavor is to replace only up to about 30% of the fish flesh.

Vegetable protein isolates are well known in the art and include isolated protein fractions from oilseeds such as soybeans, cottonseed and the like. Soy isolates are, of course, the most widely used and generally have a protein content of 90–95%. These isolates are generally produced by dissolving the soy product above or below the isoelectric point of the soy protein and then adjusting the pH of the solution to the isoelectric point to precipitate the purified protein. The present invention is not intended to be limited by the specific type of isolate which may be employed in the vegetable protein composition of the present invention. Numerous types of isolates may be employed including those which have been further processed in some fashion to improve functional properties such as gel forming ability, flavor, color, and the like. Preferred isolates for use in the present invention are soy isolates produced generally pursuant to the processes set forth in U.S. Pat. Nos. 3,642,490 and 3,694,221. The vegetable protein composition used in Kamaboko products is dried for ease of handling and storage and will preferably contain between about 60–90% by weight of a vegetable protein isolate and about 10–40% by weight of a fat emulsion having fat content exceeding 20% by weight. Most preferred are levels of 80% by weight of the vegetable protein isolate and 20% by weight of the fat emulsion.

The vegetable protein composition of the present invention also contains a quantity of a fat emulsion which significantly improves the functionality of the vegetable protein isolate as an ingredient in the Kamaboko products. The fat emulsion contains a fat at a level exceeding 20% and preferably at a level between about 20 and 70% by weight of said emulsion. The particular type of fat which may be employed is not critical to the practice of the present invention and either an animal or vegetable fat may be used. It is further not critical whether or not the fat be in a solid, semi-solid or liquid state for use in the present invention.

The fat emulsion also contains a quantity of a suitable emulsifying agent which is preferably also a vegetable protein isolate, although other types of proteinaceous materials such as caseinates and the like could also be employed as emulsifiers. Typical levels of the protein emulsifier used in preparing the fat emulsion are between about 1 and 9% by weight of said emulsion.

Other ingredients of the fat emulsion of the present invention include water soluble carbohydrates such as sugars, corn syrup solids and the like and the specific type of carbohydrates which can be employed is not considered critical to practice of the present invention. Typical levels for the carbohydrate ingredients are between about 20 and 70% by weight of said emulsion. Preferably stabilizing or buffering salts are also included as an ingredient of the fat emulsion and commonly employed stabilizing and/or buffering salts are citrate and phosphate salts such as sodium citrate, dipotassium phosphate, tetrasodium pyrophosphate, and so forth. Typical levels for the salts are between about 1 and 3% by weight of said emulsion. Minor amounts of various surfactants to improve dispersability of the emulsion or improve stability thereof may also be included as an ingredient and these are well recognized by one skilled in the art. Typical materials include various mono- and diglycerides as well as esters, and ethoxylated esters of various polyols and glycerides. These materials are present in the emulsion at levels less than 2% by weight.

The fat emulsion, which is used as an ingredient of the vegetable protein composition of the present invention is prepared in the following manner, although other procedures could also be employed.

The ingredients are dispersed in sufficient water, in the following manner and order of addition on order to achieve a solids level of about 50% prior to dewatering of the mixture. Initially, the stabilizing salt and protein emulsifier are dispersed in water at a temperature of about 110° F., followed by elevation of the temperature to 140° F. to ensure complete disposal of the protein emulsifier. The fat, is separately melted, if it is in a solid state and added together with the surfactants to the protein dispersion and mixed. This is followed by addition of the water soluble carbohydrate and heating of the entire mixture to 165° F. The fat emulsion is then homogenized and dewatered to purchase a dried fat emulsion having a fat level exceeding 20% by weight. This can be dry blended with a vegetable protein isolate to provide the vegetable protein composition of the present invention. Obviously, blending of the isolate and fat emulsion is for purposes of convenience in making Kamaboko products and these could also be used separately as ingredients insofar as manufacture of Kamaboko products pursuant to the present invention. Conversely, the vegetable protein isolate and fat emulsion can be combined before dewatering and dried together without altering the functionality of the composition in making "Kamaboko Type" products.

The following Examples are set forth to provide specific, but nonlimiting illustrations of the present invention.

EXAMPLE 1

150 lbs. of fat emulsion was prepared by initially dissolving 1.5 lbs. of potassium diphosphate in 75 lbs. of water maintained at 110° F. 4.5 lbs. of soy protein isolate, sold commercially by Ralston Purina Co. under the tradename "Supro 710" was added to the heated solution and mixed for 5 minutes. The solution containing the protein was then elevated to a temperature of 140° F. and agitated for an additional 3 minutes.

In a separate container, 27 lbs. of a fat was melted at 140° F.–145° F., and 0.75 lbs. of a mono- and diglyceride surfactant was added to the melted fat. This mixture of melted fat and surfactant was then added to the protein dispersion and mixed for 2 minutes. This was followed by the addition of 41.25 lbs. of corn syrup solids which was dissolved in the solution by vigorous agitation.

The mixture was then heated to 165° F. and held at this temperature for 5 minutes followed by homogenization and dewatering of the mixture by spray drying to yield a dried fat emulsion having a fat content of 36% by weight.

20% by weight of the above dried emulsion was then blended with 80% by weight of a soy protein isolate, sold commercially by Ralston Purina Co. and identified by the tradename "Supro 620" and evaluated on a comparative basis against "Supro 620" as an ingredient in a Kamaboko type product.

The Kamaboko product selected for this comparative test was prepared by taking 2,000 g of frozen surimi, tempering at −1° to −2° C. and chopping into small cubes. The cubes were then placed in a food chopper and chopped for between 30 seconds and 1 minute. The temperature of the surimi is then at 2° C. 30 gm of salt and 20 g of monosodium glutamate are then slowly added to the mixture while the food chopper is in continuous operation. After 1 minute, an additional 30 g of salt is added. The mixture is then chopped for an additional 3–4 minutes and 30 g of sugar added. The temperature of the mixture at this point should not be above 10° C. or below 8° C.

400 g of ice water and 100 g of starch is then mixed and added to the chopper which is in continuous operation over a 2 minute period. 60 g of egg white and 40 g of mirin are then added followed by chopping for an additional 1 minute. The product is then removed from the bowl and kneaded for 30 seconds using a spatula. The kneaded product is then extruded into a casing which is maintained in a 40° C. water bath for 1 hour followed by heating in a 90° C. bath for 40 minutes. The products are then cooled and suitable for evaluation.

Two Kamaboko products were prepared according to the above procedure wherein 30% by weight of the surimi was replaced with a soy protein isolate in one product, specifically Supro 620 and a blend of 80/20 parts by weight of Supro 620 and the fat emulsion was used to replace 30% by weight of the surimi in the second product. These were comparatively evaluated for texture and color against a control sample where no surimi replacement was made. The results of this test were as follows.

TABLE I

TEXTURAL MEASUREMENTS AND COLOR OF KAMABOKO PRODUCTS CONTAINING SOY ISOLATE AND A SOY ISOLATE/FAT EMULSION BLEND

| Sample | Textural Measurement (Okada Gelometer)[a] | | | | | Color[b] | | |
|---|---|---|---|---|---|---|---|---|
| | Gel Strength (gm) | Tawami (cm) | Softness (degrees) | Shear (degrees) | Ashi (gm × cm) | L | a | b |
| Control | 382 ± 25.5 | 4.2 ± .22 | 32 ± .9 | 100 ± 2.1 | 1604 | 70.1 | −1.7 | 7.4 |
| Soy Isolate | 313 ± 7.3 | 3.4 ± .5 | 98 ± .9 | | 1064 | 67.3 | −1.1 | 10.6 |
| Soy Isolate/Fat Emulsion (80/20) | 319 ± 8.7 | 3.9 ± .09 | 36 ± .5 | 99 ± 2.1 | 1244 | 69.6 | −1.1 | 1 −.2 |

[a]The Okada Gelometer is available from Chuo Riken; Shinagawa 2-5-1 Chuo-Ku; Tokyo, Japan, and is conventionally used by Japanese Industry for comparisons of the quality of Kamaboko. Test procedures are available from the manufacturer.
[b]Color evaluation on a Hunter Lab Colorimeter wherein color is measured by comparative readings on a "1", "a", and "b" scale. Single slices, 20mm in thickness were used for the above tests.

It may be seen from the above comparative data that surimi replacement at a level of 30% with the soy isolate/fat emulsion blend yielded a color and texture that was closer to the control than resulted with the use of soy isolate above.

EXAMPLE 2

Three dried fat emulsions were prepared as described in Example 1 containing levels of fat of 36%, 50%, and 70% by weight of the emulsion respectively. These dried emulsions were then blended with a soy protein isolate, Supro 620 in a weight ratio of 80 parts isolate/20 parts fat emulsion. These were then used to replace 30% by weight of the surimi in the Kamaboko product described in Example 1. These two products were comparatively evaluated for color and texture against a control sample, and a Kamaboko product wherein 30% by weight of the surimi was replaced with soy isolate alone. These results are set forth in Table II below.

TABLE II

TEXTURAL MEASUREMENTS AND COLOR OF KAMABOKO PRODUCTS CONTAINING SOY ISOLATE AND A SOY ISOLATE/FAT EMULSION BLEND WITH VARYING FAT LEVELS

| Sample | Textural Measurement (Okada Gelometer) | | | | | Color | | |
|---|---|---|---|---|---|---|---|---|
| | Gel Strength (gm) | Tawami (cm) | Softness (degrees) | Shear (degrees) | Ashi (gm × cm) | L | a | b |
| Control | 361 ± 48.2 | 3.6 ± .30 | 34 ± 1.8 | 99 ± 1.0 | 1300 | 73.8 | −2.2 | 9.4 |
| Soy Isolate | 297 ± 5.3 | 3.5 ± .05 | 40 ± .5 | 97 ± .9 | 1040 | 66.9 | −1.3 | 10.8 |
| Soy Isolate/Fat Emulsion (36% fat) | 266 ± 11.9 | 3.4 ± .09 | 42 ± 1.3 | 97 ± 1.3 | 904 | 70.1 | −1.3 | 10.9 |
| Soy Isolate/Fat Emulsion (50% fat) | 273 ± 12.4 | 3.4 ± .05 | 42 ± 1.3 | 96 ± .5 | 928 | 70.4 | −1.4 | 10.4 |
| Soy Isolate/Fat Emulsion (70% fat) | 271 ± 21.8 | 3.3 ± .30 | 40 ± 1.7 | 97 ± 1.3 | 894 | 71.1 | −1.4 | 10.4 |

It may be seen that the Kamaboko products which were prepared with the soy isolate/fat emulsion blend had a color as measured on the "L" scale which were similar to the control whereas the Kamaboko product containing the soy isolate alone was inferior to the control. All products had an acceptable texture.

Having described the present invention with reference to these specific embodiments, it is to be understood that numerous variations may be made without departing from the spirit of the present invention and it is intended to encompass such measurable variations or equivalents within the scope thereof.

What is claimed is:

1. A kamaboko-type gelled fish product comprising comminuted fish flesh obtained from fresh fish or frozen surimi and a composition consisting essentially of between about 60 and 90% by weight of a vegetable protein isolate and about 10–40% by weight of a fat emulsion having a fat content exceeding 20% by weight, wherein the level of said composition does not exceed about 90% by weight of the fish flesh.

2. The fish product of claim 1 wherein said vegetable protein isolate is a soy isolate.

3. The fish product of claim 1 wherein said fat emulsion has a fat content between about 20 and 70% by weight.

4. The fish product of claim 1 wherein said composition consists essentially of about 80% by weight of a vegetable protein isolate and about 20% by weight of a fat emulsion.

5. The fish product of claim 1 wherein the level of said composition does not exceed about 30% by weight of the fish flesh.

6. The fish product of claim 1 wherein said fat emulsion further comprises a protein emulsifier, a water soluble sweetener-type carbohydrate, a stabilizing salt, and a surfactant.

7. The fish product of claim 6 wherein said mixture comprises 1 to 9% by weight of a protein emulsifier, about 20 to 70% by weight of a water soluble carbohydrate, about 1 to 3% by weight of a stabilizing salt, and less than 2% by weight of a surfactant.

8. A kamaboko-type gelled fish product comprising comminuted fish flesh obtained from fresh fish or frozen surimi and a composition consisting essentially of between about 60 and 90% by weight of a vegetable protein isolate and about 10–40% by weight of a fat emulsion having a fat content between about 20 and 70% by weight wherein the level of said composition does not exceed about 30% by weight of the fish flesh.

9. The process of preparing a kamaboko-type gelled fish product comprising:
(a) blending comminuted fresh fish flesh or frozen surimi with a composition consisting essentially of between about 60 and 90% by weight of a vegetable protein isolate and about 10–40% by weight of a fat emulsion having a fat content exceeding 20% by weight, wherein the level of said composition does not exceed about 90% by weight of the fish flesh; to form a paste,
(b) shaping said paste and heating to form a gelled product.

10. The process of claim 9 wherein the vegetable protein isolate is a soy isolate.

11. The process of claim 9 wherein the fat emulsion has a fat content between about 20 and 70% by weight.

12. The process of claim 9 wherein the level of said composition does not exceed about 30% by weight of the fish flesh.

13. The process of claim 9 wherein said blend includes flavorings, sugar, salt and starch.

* * * * *

UNITED STATES PATENT AND TRADEMARK OFFICE
CERTIFICATE OF CORRECTION

PATENT NO. : 4,176,202

DATED : November 27, 1979

INVENTOR(S) : Carl D. Decker et al

It is certified that error appears in the above-identified patent and that said Letters Patent are hereby corrected as shown below:

Column 2, line 22
"isolates" should read "isolate"

Column 2, line 58
"relates Kamaboko" should read
"relates. Kamaboko"

Column 4, line 47
"carbohydrates" should read "carbohydrate"

Column 6, TABLE I

Line 7, Column 3 (Tawami)
"3.4 ± .5" should read "3.4 ± .43"

Line 7, Column 4 (Softness)
"98 ± .9" should read "35 ± .5"

Line 7, Column 5 (Shear)
"1064" should read "98 ± .9"

Line 7, Column 6 (Ashi)
"67.3" should read "1064"

UNITED STATES PATENT AND TRADEMARK OFFICE
CERTIFICATE OF CORRECTION

PATENT NO. : 4,176,202                        Page 2 of 2

DATED       : November 27, 1979

INVENTOR(S) : Carl D. Decker et al

It is certified that error appears in the above—identified patent and that said Letters Patent are hereby corrected as shown below:

Line 7, Column 7 (Color$^b$ L)
 "-1.1" should read "67.3"

Line 7, Column 8 (Color$^b$ a)
 "10.6 should read "-1.1"

Line 7, Column 9 (Color$^b$ b)
 add "10.6"

Signed and Sealed this

Twenty-second Day of April 1980

[SEAL]

Attest:

SIDNEY A. DIAMOND

Attesting Officer          Commissioner of Patents and Trademarks